US010462854B2

(12) United States Patent
Kiyosawa et al.

(10) Patent No.: US 10,462,854 B2
(45) Date of Patent: Oct. 29, 2019

(54) APPARATUS AND METHOD FOR HEATING ANNULAR WORKPIECE, AND HEATING COIL

(71) Applicant: NETUREN CO., LTD., Tokyo (JP)

(72) Inventors: Yutaka Kiyosawa, Tokyo (JP); Shigeo Takahashi, Tokyo (JP); Yasuharu Ogawa, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 447 days.

(21) Appl. No.: 15/303,607

(22) PCT Filed: Apr. 8, 2015

(86) PCT No.: PCT/JP2015/061003
§ 371 (c)(1),
(2) Date: Oct. 12, 2016

(87) PCT Pub. No.: WO2015/159777
PCT Pub. Date: Oct. 22, 2015

(65) Prior Publication Data
US 2017/0041988 A1 Feb. 9, 2017

(30) Foreign Application Priority Data
Apr. 14, 2014 (JP) .................. 2014-083027

(51) Int. Cl.
*H05B 6/10* (2006.01)
*H05B 6/44* (2006.01)
(Continued)

(52) U.S. Cl.
CPC .............. *H05B 6/102* (2013.01); *C21D 1/42* (2013.01); *C21D 9/40* (2013.01); *H05B 6/10* (2013.01);
(Continued)

(58) Field of Classification Search
CPC ... C21D 9/40; C21D 1/42; H05B 6/10; H05B 6/102; H05B 6/44; H05B 6/40; Y02P 10/253
(Continued)

(56) References Cited

U.S. PATENT DOCUMENTS 6,399,928 B1 6/2002 Gezarzick et al.
2010/0243643 A1 9/2010 Cesano et al.
(Continued)

FOREIGN PATENT DOCUMENTS

FR 2 371 848 6/1978
JP 2002-505381 2/2002
(Continued)

OTHER PUBLICATIONS

International Search Report dated Jul. 14, 2015 in International Application No. PCT/JP2015/061003.
(Continued)

*Primary Examiner* — Quang T Van
(74) *Attorney, Agent, or Firm* — Wenderoth, Lind & Ponack, L.L.P.

(57) ABSTRACT

Heating coils are opposed to a portion of an annular workpiece having a continuously provided recessed surface, and the heating coils and the annular workpiece are moved relative to each other to heat the recessed surface by induction heating. The heating apparatus includes a first heating coil having a first corner conductor portion to be opposed to a first corner portion of the recessed surface and a first bottom conductor portion connected to the first corner conductor portion to be opposed to the bottom portion, and a second heating coil having a second corner conductor portion to be opposed to a second corner portion of the recessed surface and a second bottom conductor portion
(Continued)

connected to the second corner conductor portion to be opposed to the bottom portion.

15 Claims, 4 Drawing Sheets

(51) Int. Cl.
    *H05B 6/14*     (2006.01)
    *C21D 1/42*     (2006.01)
    *C21D 9/40*     (2006.01)
    *H05B 6/40*     (2006.01)

(52) U.S. Cl.
    CPC ................. *H05B 6/40* (2013.01); *H05B 6/44* (2013.01); *Y02P 10/253* (2015.11)

(58) Field of Classification Search
    USPC ....... 219/642, 635, 639, 640, 647, 652, 673, 219/676, 656, 661; 266/129; 148/572, 148/573, 567, 559
    See application file for complete search history.

(56) References Cited

U.S. PATENT DOCUMENTS

2012/0125919 A1     5/2012   Tanaka et al.
2016/0316523 A1*  10/2016  Inaba ........................ C21D 9/08

FOREIGN PATENT DOCUMENTS

| JP | 2004-277820 | 10/2004 |
| JP | 2006-302683 | 11/2006 |
| JP | 2011-47037 | 3/2011 |
| WO | 2011/013774 | 2/2011 |

OTHER PUBLICATIONS

Extended European Search Report dated Sep. 20, 2017 in corresponding European patent application No. 15780591.

* cited by examiner

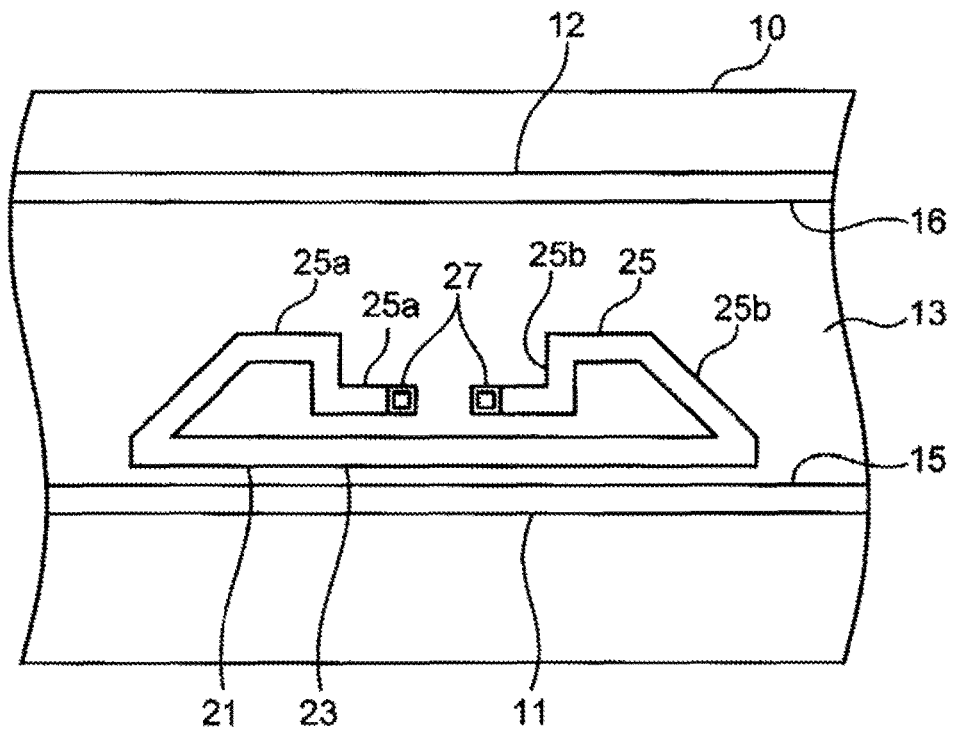
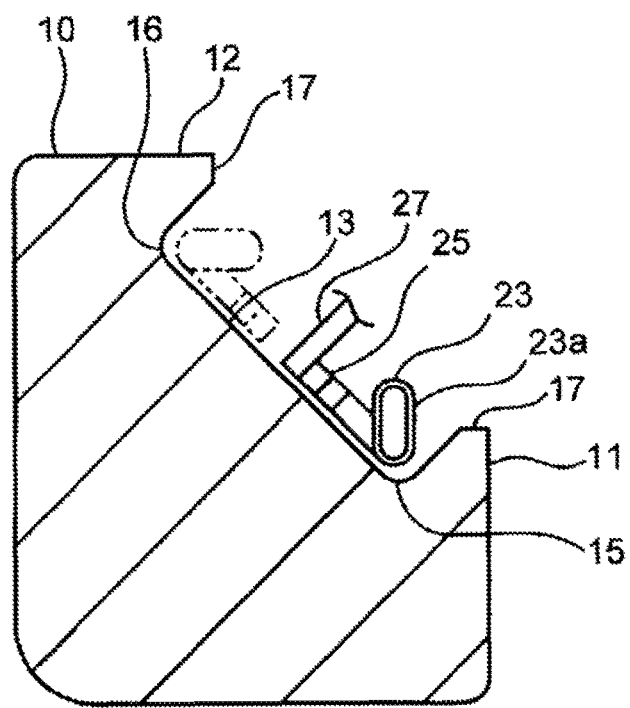

APPARATUS AND METHOD FOR HEATING ANNULAR WORKPIECE, AND HEATING COIL

TECHNICAL FIELD

The present invention relates to an apparatus and a method for heating a recessed surface of an annular workpiece by induction heating, and a heating coil for heating the recessed surface of the workpiece.

BACKGROUND ART

A related heating apparatuses and heating coils are configured to heat an annular workpiece. For example, it is described in Patent Document 1 identified below that, in order to heat an annular workpiece by induction heating, a zigzag heating coil is opposed to a portion of the annular workpiece, and the annular workpiece and the heating coil are moved relative to each other, for example by rotating the annular workpiece so that a treatment target portion in a form of an endless loop is induction-heated.

PRIOR ART DOCUMENT

Patent Document

Patent Document 1: JP2011-47037A however, for a workpiece having a recessed surface formed by rims and a bottom portion extending continuously in a longitudinal direction of the workpiece, it is not easy to uniformly heat the bottom portion of the recessed surface and to sufficiently heat corner portions between the rims and the bottom portion. For example, in a case where a zigzag heating coil like Patent Document 1 is inserted into the recessed surface and the workpiece and the heating coil are moved relative to each other to perform induction heating, the corner portions could not be sufficiently heated together with the bottom portion.

SUMMARY OF INVENTION

Problem to be Solved by Invention

It is an object of the present invention to provide an apparatus and method for heating an annular workpiece which can reliably heat each corner portion of a recessed surface together with a bottom portion, and another object is to provide a heating coil which can easily heat the corner portions and the bottom portion of the recessed surface in a substantially equal manner.

Means for Solving the Problem

According to an aspect of the present invention, a heating apparatus for an annular workpiece is provided. The heating apparatus is configured such that heating coils are opposed to a portion of the annular workpiece having a first rim, a second rim and a bottom portion between the first rim and the second rim that are provided continuously in a circumferential direction, and the heating coils and the annular workpiece moved relative to each other in the circumferential direction to heat a recessed surface of the annular workpiece by induction heating, the recessed surface being formed by the first rim, the second rim and the bottom portion. The heating coils includes a first heating coil having a first corner conductor portion to be opposed to a first corner portion between the first rim and the bottom portion, and a first bottom conductor portion connected to the first corner conductor portion to be opposed to the bottom portion, and a second heating coil having a second corner conductor portion to be opposed to a second corner portion between the second rim and the bottom portion, and a second bottom conductor portion connected to the second corner conductor portion to be opposed to the bottom portion.

According to another aspect of the present invention, heating method for an annular workpiece is provided. In the heating method, heating coils are opposed to a portion of the annular workpiece having a first rim, a second rim and a bottom portion between the first rim and the second rim that are provided continuously in a circumferential direction, and the heating coils and the annular workpiece are moved relative to each other in the circumferential direction to heat a recessed surface of the annular workpiece by induction heating, the recessed surface being formed by the first rim, the second rim and the bottom portion. The heating coils includes a first heating coil and a second heating coil. The heating method includes arranging a first corner conductor portion of the first heating coil to be opposed to a first corner portion between the first rim and the bottom portion and a first bottom conductor portion of the first heating coil to be opposed to the bottom portion, arranging a second corner conductor portion of the second heating coil to be opposed to a second corner portion between the second rim and the bottom portion and a second bottom conductor portion of the second heating coil to be opposed to the bottom portion, and heating the recessed surface such that the first heating coil is disposed at a position corresponding to a deformation of the recessed surface on a side of the first rim and such that the second heating coil is disposed at a position corresponding to a deformation of the recessed surface on a side of the second rim.

According to another aspect of the present invention, the heating coil is configured to be opposed to a portion of a workpiece having a rim and a bottom portion that provided continuously in a longitudinal direction and to be moved relative to the workpiece in the longitudinal direction to heat a recessed surface of the workpiece, the recessed surface being formed by the rim and the bottom portion. The heating coil includes a corner conductor portion extending in the longitudinal direction to be opposed to a corner portion between the rim and the bottom portion, and a bottom conductor portion connected to the corner conductor portion in series to be opposed to the bottom portion. The bottom conductor portion has a bottom longitudinal conductor portions extending in the longitudinal direction, and the corner conductor portion is longer than the bottom longitudinal conductor portion.

Advantageous Effects of Invention

According to the workpiece heating apparatus and method described above, each of the heating coils has the corner conductor portion to be opposed to one of the corner portions, and the bottom conductor portion to be opposed to the bottom portion, so that the corner portion and the bottom portion are heated simultaneously. The first corner conductor portions of the first heating coils are disposed so as to be opposed to the first corner portion but separated from the second corner portion, and the second corner conductor portions of the second heating coils are disposed so as to be opposed to the second corner portion but separated from the first corner portion. Accordingly, each heating coil opposed to one of the two corner portions can be disposed at a wide distance from the other corner portion. Therefore, the heating coils can be easily displaced with respect to the recessed surface so that the positions of the respective heating coils can be adjusted easily.

In this manner, even when various deformations are generated on the first rim side or the second rim side at the time of heating the annular workpiece, each of the first heating coils or each of the second heating coils can be disposed at a position corresponding to the deformations. Therefore, a gap between the first rim with the bottom portion and the first heating coil and a gap between the second rim with the bottom portion and the second heating coil can be adjusted with high accuracy individually so that the first corner portion and the second corner portion can be reliably heated together with the bottom portion.

According to the heating coil described above, the corner conductor portion to be opposed to the corner portion of the workpiece and the bottom longitudinal conductor portion to be opposed to the bottom portion extend in the longitudinal direction. The corner conductor portion is formed to be longer than the bottom longitudinal conductor portion. Accordingly, an amount of heat to be supplied to the corner portion by the corner conductor portion can be made larger than an amount of heat to be supplied to the bottom portion by the bottom longitudinal conductor portion. The corner portion of the workpiece is formed by the rim and the bottom portion. The corner portion of the workpiece has a wider region and also a larger volume to be heated than the bottom portion. Therefore, the amounts of heats to be supplied can be adjusted when the corner conductor portion is formed to be suitably longer than the bottom longitudinal conductor portion. Thus, the bottom portion and the corner portion can be easily heated in a substantially equal manner.

BRIEF DESCRIPTION OF DRAWINGS

FIG. 2 is a front view showing a first heating coil of the heating apparatus

FIG. 3 is a sectional view showing an annular workpiece and the first heating coil;

DESCRIPTION OF EMBODIMENT

Hereinafter, an embodiment of the present invention will e described in detail with reference to the drawings.

A workpiece to be heated is formed out of a material which can be inductively heated. The workpiece is a workpiece which has a bottom portion extending in a longitudinal direction, and rims protruding from the bottom portion and extending in the longitudinal direction. In the workpiece, a recessed surface having corner portions is provided in the longitudinal direction. Each corner portion is formed by a side surface of one of the rims and a bottom surface of the bottom portion.

Figure 1:
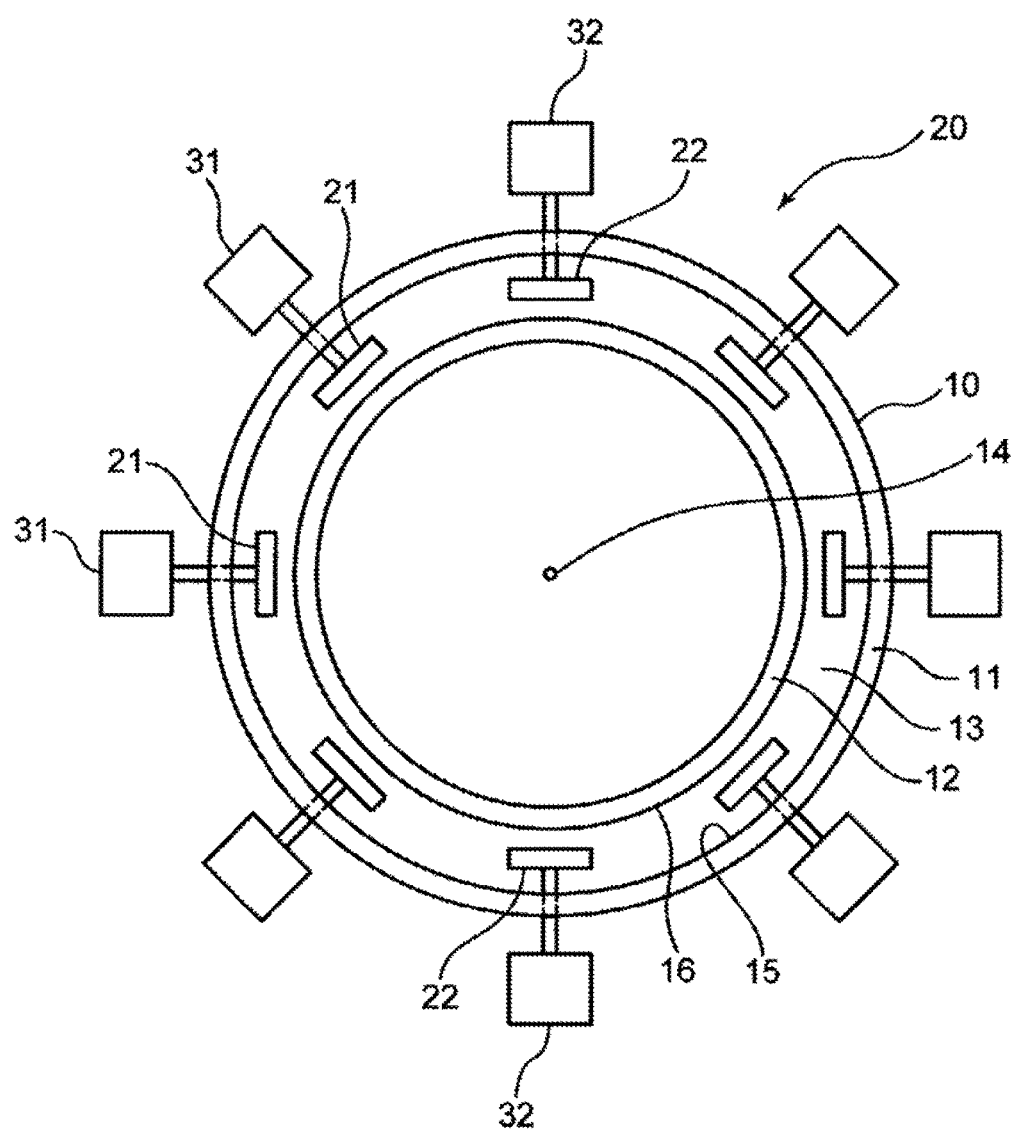
FIG. 1 is a schematic plan view showing an annular workpiece heating apparatus according to an embodiment of the invention.

In the embodiment, description will be made using an annular workpiece 10 having a circular annular shape, as shown in FIGS. 1 and 3. In the annular workpiece 10, a first rim 11, a second rim 12, and a bottom portion 13 between the first rim 11 and the second rim 12 are provided continuously respectively in a circumferential direction which is the longitudinal direction. A bottom surface which faces outward and which is inclined at a substantially fixed gradient relative to an axis 14 of the annular workpiece 10 is provided in the bottom portion 13. Side surfaces are provided in the first and second rims 11, 12 and in a substantially perpendicular direction to the bottom surface of the bottom portion 13.

The side surface of the first rim 11 and the bottom surface of the bottom portion 13 are adjacent to each other through a first corner portion 15. The side surface of the second rim 12 and the bottom surface of the bottom portion 13 are adjacent to each other through a second corner portion 16. A recessed surface is formed by the side surface of the first rim 11, the side surface of the second rim 12, and the bottom surface of the bottom portion 13. A region to be heated in the annular workpiece 10 is the recessed surface. For example, the region to be heated is the bottom surface of the bottom portion 13 including the first and second corner portions 15, 16. In the embodiment, the whole of the recessed surface consisting of the bottom surface of the bottom portion 13 including the first and second corner portions 15, 16 and the side surfaces of the first and second rims 11, 12 is used as the region to be heated.

A heating apparatus 20 is configured such that heating coils 21, 22 are opposed to a portion of the annular workpiece 10, and such that the heating cods 21, 22 and the annular workpiece 10 are moved relative to each other in the circumferential direction to heat the recessed surface by induction heating.

In the embodiment, the annular workpiece 10 is supported by a support portion. When the annular workpiece 10 is rotated around the axis, the recessed surface moves in the circumferential direction. The first and second heating coils 21, 22 are arranged along the circumference of the annular workpiece 10 so as to be distributed in the circumferential direction in a state in which they are supported displaceably by first and second position adjusting portions 31, 32 respectively.

The numbers, positions, shapes, etc. of the first and second heating coils 21, 22 can be set suitably in accordance with the shape of the region to be heated in the annular workpiece 10. Since the bottom surface of the bottom portion 13 of the annular workpiece 10 is an inclined surface herein, the number of the second heating coils for heating the second rim 12 side large in diameter is made larger than the number of the first heating coils 21 for heating the first rim 11 side small in diameter. The first and second heating coils 21, 22 are arranged to be equally distributed in the circumferential direction.

As shown in FIGS. 2 and 3, each of the first heating coils 21 has a first corner conductor portion 23, a first bottom conductor portion 25, and a pair of first lead portions 27. The first corner conductor portion 23 is opposed to the first corner portion 15 between the bottom portion 13 and the first rim 11. The first bottom conductor portion 25 is connected to opposite ends of the first corner conductor portion 23 in series to be opposed to the bottom portion 13. The pair of the first lead portions 27 are connected to the first bottom conductor portion 25 in series.

In the first heating coil 21 as a whole, the respective portions ranging from one first lead portion 27 to the other first lead portion 27 are connected in series so that an electric current can be applied between the pair of first lead portions 27 while a coolant can be passed internally. In addition, the first corner conductor portion 23 and the first bottom conductor portion 25 are disposed along one plane. The pair of the lead portions 27, 28 protrude in a direction intersecting with the plane, and are connected to a not-shown power supply side.

The first corner conductor portion 23 extends in the circumferential direction of the annular workpiece 10 to be formed linearly. The first corner conductor portion 23 is disposed to be substantially parallel with a tangential line of the first corner portion 15 closest to the first corner conductor portion 23 when the first corner conductor portion 23 is opposed to the annular workpiece 10. In the embodiment, the first corner conductor portion 23 consists of a metal pipe which has a long round shape in section and which has a pair of flat wall surfaces. The metal pipe of the first corner conductor portion 23 has the flat wall surfaces. One of the flat wall surfaces serves as a first rim opposing surface 23a opposed to the side surface of the first rim 11. The first rim opposing surface 23a is fixed to the first bottom conductor portion and is arranged such that it is separated from the side surface of the first rim 11 more on a side of the top 17 of the first rim 11 than on a side of the bottom portion 13.

The first bottom conductor portion 25 has first bottom longitudinal conductor portions 25a extending in the circumferential direction. Through first connection conductor portions 25b, the bottom longitudinal conductor portions 25a are connected to each other in series and the first bottom longitudinal conductor portions 25a are connected to the first corner conductor portion 23 in series. The first bottom conductor portion 25 including the bottom longitudinal conductor portions 25a and the first connection conductor portions 25b consists of a metal pipe which has a quadrilateral shape in section.

The first bottom longitudinal conductor portions 25a are formed linearly respectively, and are disposed to be substantially parallel to the first corner conductor portion 23. The first bottom longitudinal conductor portions 25a are disposed to be located at different positions in the circumferential direction and at different distances from the first corner conductor portion 23. Each of the first bottom longitudinal conductor portions 25a consists of two split parts disposed to be located at different positions in the circumferential direction and at a substantially equal distance from the first corner conductor portion 23. The total length of the split parts of the first bottom longitudinal conductor portions 25a is shorter than that of the first corner conductor portion 23.

Figure 4:
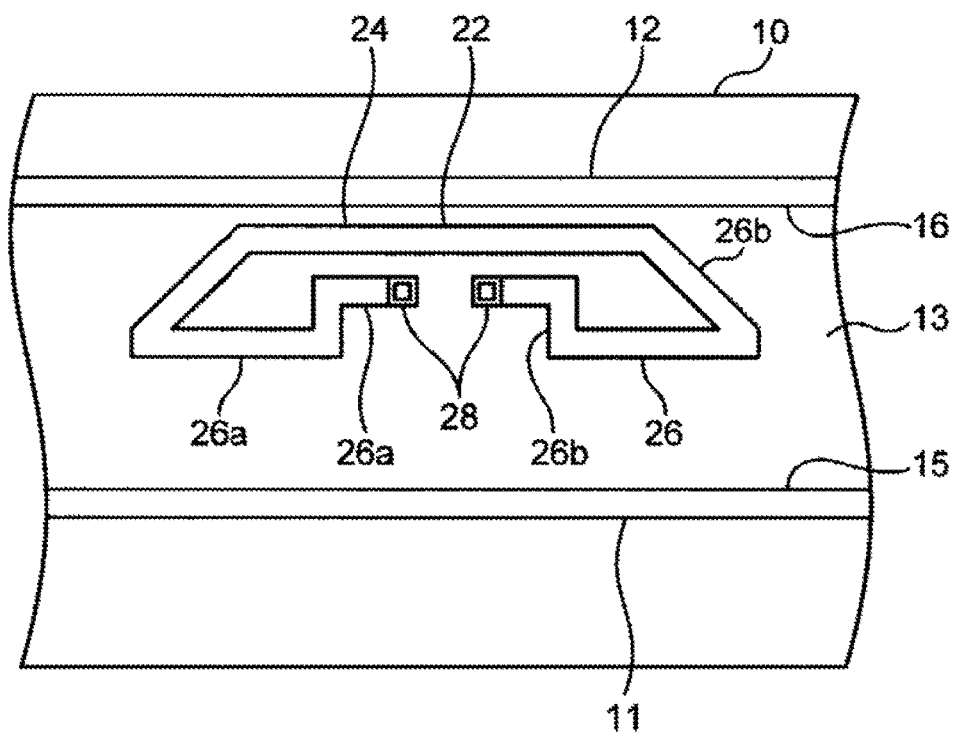
FIG. 4 is a front view showing a second heating coil of the heating apparatus.
Figure 5:
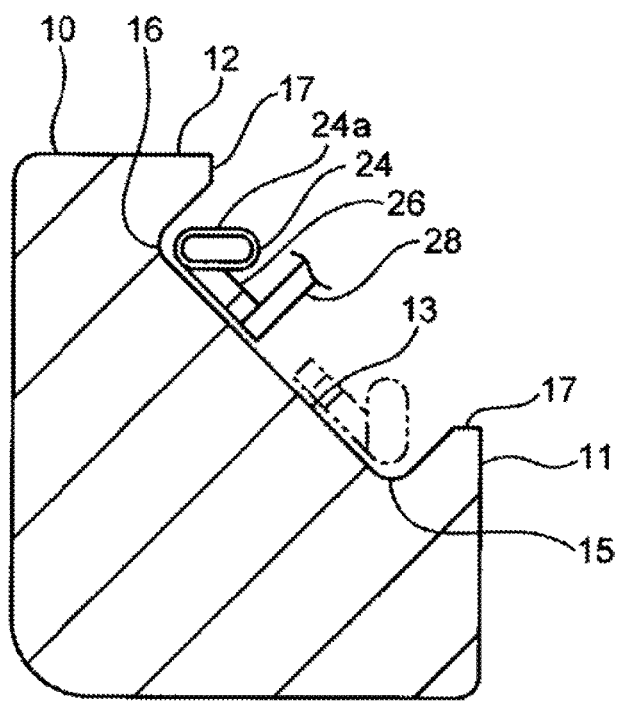
FIG. 5 is a sectional view showing the annular workpiece and the second beating coil.

As shown in FIGS. 4 and 5, each of the second heating coils 22 has a second corner conductor portion 24, a second bottom conductor portion 26, and a pair of second lead portions 28. The second corner conductor portion 24 is opposed to the second corner portion 16 between the bottom portion 13 and the second rim 12. The second bottom conductor portion 26 is connected to opposite ends of the second corner conductor portion 24 in series to be opposed to the bottom portion 13. The pair of the second lead portions 28 are connected to the second bottom conductor portion 26 in series.

In the second heating coil 22 as a whole, the respective portions ranging from one second lead portion 28 to the other second lead portion 28 are connected in series so that an electric current can be applied between the pair of the second lead portions 28 while a coolant can be passed internally. In addition, the second corner conductor portion 24 and the second bottom conductor portion 26 are disposed along one plane. The pair of the lead portions 27, 28 protrude in the direction intersecting with the plane, and are connected to the not-shown power supply side.

The second corner conductor portion 24 extends in the circumferential direction of the annular workpiece 10 to be formed linearly. The second corner conductor portion 24 is disposed to be substantially parallel with a tangential line of the second corner portion 16 closest to the second corner conductor portion 24 when the second corner conductor portion 24 is opposed to the annular workpiece 10. In the embodiment, the second corner conductor portion 24 consists of a metal pipe which has a long round shape in section and which has a pair of flat wall surfaces.

The metal pipe of the second corner conductor portion 24 has the flat wall surfaces. One of the wall surfaces serves as a second rim opposing surface 24a opposed to the side surface of the second rim 12. The second rim opposing surface 24a is fixed to the second bottom conductor portion 26 and is arranged such that it is separated from the side surface of the second rim 12 more on a side of the top 17 of the second rim 12 than on a side of the bottom portion 13.

The second bottom conductor portion 26 has second bottom longitudinal conductor portions 26a extending in the circumferential direction. Through second connection conductor portions 26b, the second bottom longitudinal conductor portions 26a are connected to each other in series and the second bottom longitudinal conductor portions 26a are connected to the second corner conductor portion 24 in series. The second bottom conductor portion 26 including the second bottom longitudinal conductor portions 26a and the second connection conductor portions 26b consists of a metal pipe which has a quadrilateral shape in section.

The second bottom longitudinal conductor portions 26a are formed linearly respectively and are disposed to be substantially parallel to the second corner conductor portion 24. The second bottom longitudinal conductor portions 26a are disposed to be located at different positions from each other in the circumferential direction and at different distances from the second corner conductor portion 24. Each of the second bottom longitudinal conductor portions 26a consists of two split parts disposed to be located at positions different from each other in the circumferential direction and at a substantially equal distance from the second corner conductor portion 24. The total length of the split parts of the second bottom longitudinal conductor portions 26a is shorter than that of the second corner conductor portion 24.

As shown in FIG. 1, in the heating apparatus 20, the first and second heating coils 21, 22 are arranged to be distributed in the circumferential direction of the annular workpiece 10 and to be opposed to the recessed surface. The numbers of the first and second heating coils 21, 22 are set in accordance with the shape of the recessed surface of the annular workpiece 10. Since the bottom portion 13 of the recessed surface has a larger diameter on the first rim 11 side than on the second rim 12 side herein, the pair of the second heating coils 22 are disposed on the second corner portion 16 side and at positions opposite to each other by 180 degrees. Three pairs of the first heating coils 21 are disposed on the first corner portion 16 side and in equally divided positions of the circumferentially remaining part.

Figure 6:
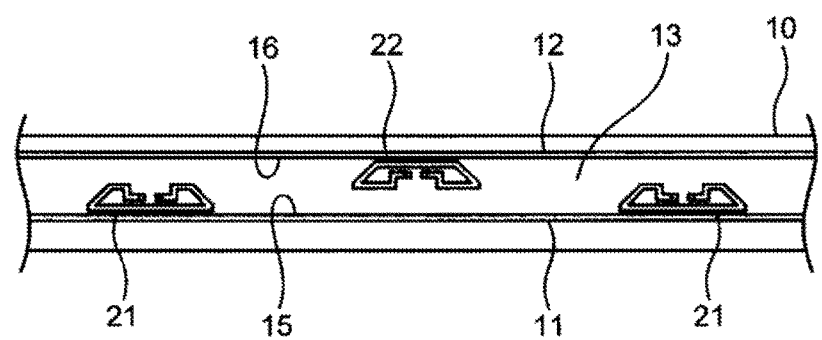
FIG. 6 is a development view illustrating disposition of the first and second heating coils.

As shown in FIG. 6, the first heating coils 21 and the second heating coils 22 are disposed to be located at different positions from each other in the direction of the axis 14 of the annular workpiece 10 in a state in which they are opposed to predetermined places of the annular workpiece 10. The first bottom conductor portions 25 and the second bottom conductor portions 26 are disposed to be opposed to different regions from each other in a width direction of the bottom portion 13.

The first heating coils 21 are supported by the first position adjusting portions 31 respectively so as to be displaceable with respect to the recessed surface. The second heating coils 22 are supported by the second position adjusting portions 32 respectively so as to be displaceable with respect to the recessed surface. The first and second position adjusting portions 31, 32 may support the first and second heating coils 21, 22 at positions set with respect to the direction of the diameter of the annular workpiece 10 and the direction of the axis 14 or at angles set with respect to the direction of the axis 14 and the circumferential direction.

In the configuration according to the embodiment, for example, the first or second heating coils 21, 22 are mounted on attachment base portions through brackets and the respective portions are aligned and fastened firmly so that the first or second heating coils 21, 22 can be disposed at the predetermined places and the predetermined angles. Although not limited particularly, according to the configuration herein, relative positions of the attachment base portions, the brackets, and the first and second heating coils 21, 22 may be adjusted and fastened by use of long holes etc.

To heat the annular workpiece 10 using such a heating apparatus 20 for the annular workpiece 10, first, the annular workpiece 10 is supported rotatably around the axis 14, and the first and second heating coils 21, 22 are arranged in a distributed manner at multiple locations along the circumferential direction of the annular workpiece 10. The positions of the first and second heating coils 21, 22 are adjusted by the first and second position adjusting portions 31, 32 so as to be opposed to the predetermined places of the recessed surface of the annular workpiece 10 respectively.

When the recessed surface of the workpiece is heated, the annular workpiece 10 is deformed due to thermal expansion. The deformation varies according to various conditions such as the shape of the annular workpiece 10, heating temperature, etc. However, when only the recessed surface of the annular workpiece 10 according to the embodiment is heated, a deformation amount of the recessed surface on the first rim 11 side varies from that on the second rim 12 side. Therefore, by the first and second position adjusting portions, the first heating coils 21 and the second heating coils 22 are adjusted and disposed at positions corresponding to the deformation amounts of the recessed surface on the first rim 11 side and the second rim 12 side.

In the embodiment, the deformation amounts generated when the recessed surface of the annular workpiece 10 to be heated is heated to a predetermined temperature range are obtained in advance by measurement and calculation etc. Initial positions of the first and second heating coils 21, 22 are set respectively in advance so that when the recessed surface is heated to the predetermined temperature range, the first and second heating coils 21, 22 can be disposed to be opposed to the recessed surface at the predetermined gaps.

The positions of the first and second heating coils 21, 22 are adjusted by the first and second position adjusting portions prior to start of heating. In this manner, the first and second heating coils 21, 22 are disposed and fixed respectively at the initial positions set in advance.

The first corner conductor portions 23 of the first heating coils 21 are opposed to the first corner portion 15 between the first rim 11 and the bottom portion 13. In addition, the first bottom conductor portions 25 of the first heating coils 21 are opposed to the bottom portion 13. The second corner conductor portions 24 of the second heating coils 22 are opposed to the second corner portion 16 between the second rim 12 and the bottom portion 13. In addition, the second bottom conductor portions 26 of the second heating coils 22 are opposed to the bottom portion 13. At the initial positions, the first and second heating coils 21, 22 are disposed respectively at places slightly displaced from the recessed surface before they reach the predetermined temperature range.

The annular workpiece 10 is rotated in this state to move the first and second heating coils 21, 22 and the annular workpiece 10 relative to each other in the circumferential direction while an electric current is applied to the first and second heating coils 21, 22 to heat the recessed surface of the annular workpiece 10 by induction heating.

When the temperature of the recessed surface increases to reach the predetermined temperature range, the first and second heating coils 21, 22 whose positions have been adjusted in advance are disposed at the predetermined positions with respect to the recessed surface. The first and second corner conductor portions 23, 24 are disposed at the predetermined gaps with respect to the first and second corner portions respectively and the first and second bottom conductor portions 25, 26 are disposed at the predetermined gaps with respect to the bottom portion respectively. When the recessed surface is inductively heated to the predetermined temperature range in this state, the heating can be terminated.

After the heating, a subsequent treatment step or a cooling step can be applied according to the purpose. When the annular workpiece 10 is made of a steel material, the annular workpiece 10 may be brought into contact with the coolant either to be cooled rapidly and quenched or to be cooled slowly and tempered or annealed.

According to the aforementioned heating apparatus and the aforementioned heating method, the first or second heating coil 21, 22 has the first or second corner conductor portion 23, 24 which is opposed to the first or second corner portion 15, 16, and the first or second bottom conductor portion 26 which is opposed to the bottom portion 13. Accordingly, when the heating coil 21, 22 opposed to the first or second corner portion 15, 16 and the bottom portion 13 generates heat, the first or second corner portion 15, 16 and the bottom portion 13 can be heated simultaneously.

The first corner conductor portion 23 of the first heating coil 21 is disposed to be opposed to the first corner portion 15 but separated from the second corner portion 16. The second corner conductor portion 24 of the second heating coil 22 is disposed to be opposed to the second corner portion 16 but separated from the first corner portion 15. Accordingly, each of the heating coils 21, 22 opposed to one of the corner portions can be disposed at a wide distance from the other corner portion. Therefore, it is easy to displace the heating coils 21, 22 with respect to the recessed surface and it is easy to adjust the positions of the heating coils 21, 22.

Thus, even in the case where various deformations are generated on the first rim 11 side or the second rim 12 side at the time of heating the annular workpiece 10, the first heating coils 21 or the second heating coils 22 can be disposed at positions corresponding to the deformations. As a result, the gap between the first rim 11 with the bottom portion 13 and each of the first heating coils 21, and the gap between the second rim 12 with the bottom portion 13 and each of the second heating coils 22 can be adjusted accurately individually so that the first corner portion and the second corner portion can be surely heated together with the bottom portion.

In the heating apparatus 20, the first heating coils 21 and the second heating coils 22 are arranged and distributed in the circumferential direction such that the number and locations thereof correspond to the shape or the like of the annular workpiece 10. While the annular workpiece 10 is rotated, the recessed surface is inductively heated. Accordingly, the degree of heating can be made uniform easily in the circumferential direction.

In the heating apparatus 20, the first bottom conductor portions 25 and the second bottom conductor portions 26 are opposed to different regions of the bottom portion 13 in the width direction of the bottom portion 13. Accordingly, the different regions can be heated by the first bottom conductor portions 25 and the second bottom conductor portions 26 respectively. When the positions, lengths, shapes, etc, of the bottom conductor portions 25, 26 are adjusted, the bottom portion 13 can be heated efficiently.

In the heating apparatus 20, the corner conductor portions 23, 24 and the bottom conductor portions 25, 26 in ones or both of the first heating coils 21 and the second heating coils 22 are disposed along one plane, and opposed to one or both of the rims 11, 12 and the bottom portion 13. Each of the rims 11, 12 is formed into a curved surface shape.

Accordingly, the shapes of the corner conductor portions 23, 24 and the bottom conductor portions 25, 26 can be simplified so that the heating coils 21, 22 can be manufactured easily.

According to each of the aforementioned first and second heating coils 21, 22, the corner conductor portion 23, 24 opposed to the corner portion 15, 16 of the workpiece, and the bottom longitudinal conductor portions 25a, 26a opposed to the bottom portion 13 extend in the longitudinal direction, and the corner conductor portion 23, 24 is formed to be longer than the bottom longitudinal conductor portions 25a, 26a. Accordingly, an amount of heat to be supplied to the corner portion 15, 16 by the bottom conductor portion 25 or 26 can be made larger than an amount of heat to be supplied to the bottom portion 13 by the bottom longitudinal conductor portions 25a, 26a. The corner portion 15, 16 is formed by the rim 11 or 12 and the bottom portion 13. The corner portion 15, 16 has a wider region and also a larger volume to be heated than the bottom portion 13. Therefore, the amounts of heat to be supplied can be adjusted when the corner conductor portion 23, 24 is formed to be suitably longer than the bottom longitudinal conductor portions 25a, 26a. Accordingly, the bottom portion 13 and the corner portion 15, 16 can be easily heated in a substantially equal manner.

Each of the first and second heating coils 21, 22 has the bottom longitudinal conductor portions 25a, 26a which are connected to each other in series. The bottom longitudinal conductor portions 25a, 26a are disposed to be located at the different distances from the corner conductor portion 23, 24 and at the different positions from each other in the circumferential direction. Accordingly, the length of the heating coil 21, 22 in the circumferential direction can be suppressed to be shorter but a wider range of the bottom portion 13 can be heated. That is, the region or volume to be heated by the bottom longitudinal conductor portions 25a, 26a is remarkably smaller than the region or volume to be heated by the corner conductor portion 23, 24. Accordingly, even when the bottom longitudinal conductor portions 25a, 26a are made remarkably shorter than the corner conductor portion 23, 24, heating can be performed sufficiently. Therefore, the bottom longitudinal conductor portions 25a, 26a are disposed at the different distances from the corner conductor portion 23, 24 in the length range of the corner conductor portion 23, 24 in the longitudinal direction. Thus, regions in the width direction of the bottom portion 13 of the annular workpiece 10 can be heated sufficiently so that a wider range in the width direction can be heated.

In each of the first and second heating coils 21, 22, the corner conductor portion 23, 24 has the rim opposing surface 23a, 24a opposed to the rim 11, 12. Accordingly, the side surface of the rim 11, 12 can be heated when heating the bottom portion 13 and the corner portion 15, 16. The rim opposing surface 23a, 24a is arranged such that it is separated from the side surface of the rim 11, 12 more on a side of the top 17 of the rim 11, 12 than on a side of the bottom portion 13. Accordingly, the amount of heat to be applied to the top 17 side of the rim 11, 12 can be made smaller than the bottom portion 13 side. Thus, the top 17 side of the rim 11, 12 can be prevented from being excessively heated so that the recessed surface can be heated in a concentrated manner.

The embodiment described above can be modified as appropriate within the scope of the invention.

In the above description, each of the first heating coils 21 and the second heating coils 22 is supported such that it is set in advance by the first or second position adjusting portion 31, 32. However, a driving unit may be provided in the lint or second position adjusting portion 31, 32 so that each of the heating coils 21, 22 can be displaced by the driving unit. In that case, a deformation of the annular workpiece 10 on the first rim 11 side or a deformation on the second rim 12 side may be detected by a sensor or the like during the heating, and each of the healing coils 21, 22 may be displaced by the driving unit in accordance with the detection result, so that each of the heating coils 21, 22 can follow the deformation of the annular workpiece 10.

While the example of heating the circular annular workpiece 10 has been described above, the present invention is similarly applicable to any workpiece 10 having a recessed surface formed by rims 11, 12 and a bottom portion 13 formed along its longitudinal direction.

While the workpiece having the bottom portion 13 and the rims 11, 12 extending in the longitudinal direction with a fixed cross sectional shape has been described in the above example, the shape of the recessed surface may be modified as appropriate. For example, there is no limitation on a shape other than the shapes of the heating target side surfaces of the rims 11, 12. The workpiece may have a plurality of recessed surfaces and may have a shape that does not have a portion between the recessed surfaces that may block a relative movement of the heating coils 21, 22 when the workpiece 10 and the heating coils 21, 22 are moved relative to each other in a longitudinal direction.

The example in which the bottom surface of the bottom portion 13 consists of an inclined surface formed to face outward and the side surfaces of the pair of the rims 11, 12 are formed in the substantially perpendicular direction to the bottom surface of the bottom portion 13 has been described above. However, there is no limit on the shape or direction of the recessed surface of the region to be heated. For example, the recessed surface may be formed in any other surface such as an end surface of the workpiece 10 or may be formed to face inward. In addition, the bottom surface of the bottom portion 13 may have a cylindrical side surface shape formed along the axis 14. Further, only one rim may be provided.

In the above description, the first or second bottom conductor portion 25, 26 has two first or second bottom longitudinal conductor portions 25a, 26a. However, the number of the first or second bottom longitudinal conductor portions 25a, 26a may be one, or three or more. Further, each of the first or second bottom longitudinal conductor portions 25a, 26a may be formed not into two split parts. Alternatively, the first or second bottom longitudinal conductor portion 25a, 26a may be formed continuously without being split.

The present application is based on Japanese Patent Application No. 2014-083027 filed on Apr. 14, 2014, the contents of which are incorporated herein, by reference.

DESCRIPTION OF REFERENCE SIGNS 10 annular workpiece
11 first rim
12 second rim
13 bottom portion
14 axis
15 first corner portion
16 second corner portion.
17 top
20 heating apparatus
21 first heating coil
22 second heating coil
23 first corner conductor portion
23a first rim opposing surface
24 second corner conductor portion
24a second rim opposing surface
25 first bottom conductor portion
25a first bottom longitudinal conductor portion
25b first connection conductor portion
26 second bottom conductor portion
26a second bottom longitudinal conductor portion
26b second connection conductor portion
27 first lead portion
28 second lead portion
31 first position adjusting portion
32 second position adjusting portion

The invention claimed is:

1. A heating apparatus for an annular workpiece having a first rim, a second rim and a bottom portion between the first rim and the second rim that are provided continuously in a circumferential direction, the heating apparatus comprising heating coils to be opposed to a portion of the annular workpiece, the heating coils and the annular workpiece being movable relative to each other in the circumferential direction to heat a recessed surface of the annular workpiece by induction heating, the recessed surface being formed by the first rim, the second rim and the bottom portion, wherein the heating coils comprise:

a first heating coil comprising a first corner conductor portion opposed to a first corner portion between the first rim and the bottom portion, and a first bottom conductor portion connected to the first corner conductor portion so as to be opposed to the bottom portion; and a second heating coil comprising a second corner conductor portion opposed to a second corner portion between the second rim and the bottom portion, and a second bottom conductor portion connected to the second corner conductor portion to be opposed to the bottom portion, wherein the first bottom conductor portion comprises a first bottom longitudinal conductor portion extending in the circumferential direction, the first corner conductor portion being longer than the first bottom longitudinal conductor portion, and the second bottom conductor portion comprises a second bottom longitudinal conductor portion extending in the circumferential direction, the second corner conductor portion being longer than the second bottom longitudinal conductor portion.

2. The heating apparatus according to claim 1, further comprising a first position adjusting portion supporting the first heating coil such that the first heating coil is displaceable with respect to the recessed surface of the annular workpiece; and a second position adjusting portion supporting the second heating coil such that the second heating coil is displaceable with respect to the recessed surface.

3. The heating apparatus according to claim 1, wherein the heating coils comprise a plurality of sets of the first and second heating coils, and the plurality of sets of the first and second heating coils are arranged so as to be distributed in the circumferential direction, and the annular workpiece is rotated to heat the recessed surface of the annular workpiece by induction heating.

4. The heating apparatus according to claim 1 wherein the first bottom conductor portion and the second bottom conductor portion are opposed to different regions of the bottom portion of the annular workpiece in a width direction of the bottom portion.

5. The heating apparatus according to claim 1, wherein the first corner conductor portion and the first bottom conductor portion of the first heating coil are disposed along a plane to be opposed to the first rim and the bottom portion of the annular workpiece, the first rim and the bottom portion having a curved surface shape.

6. The heating apparatus according to claim 5, wherein the second corner conductor portion and the second bottom conductor portion of the second heating coil are disposed along a plane to be opposed to the second rim and the bottom portion of the annular workpiece, the second rim and the bottom portion having a curved surface shape.

7. A heating method for an annular workpiece having a first rim, a second rim and a bottom portion between the first rim and the second rim that are provided continuously in a circumferential direction, wherein heating coils are opposed to a portion of the annular workpiece, and the heating coils and the annular workpiece are moved relative to each other in the circumferential direction to heat a recessed surface of the annular workpiece by induction heating, the recessed surface being formed by the first rim, the second rim and the bottom portion, and the heating coils including a first heating coil and a second heating coil, the heating method comprising:

arranging a first corner conductor portion of the first heating coil to be opposed to a first corner portion between the first rim and the bottom portion and a first bottom conductor portion of the first heating coil to be opposed to the bottom portion;

arranging a second corner conductor portion of the second heating coil to be opposed to a second corner portion between the second rim and the bottom portion and a second bottom conductor portion of the second heating coil to be opposed to the bottom portion; and heating the recessed surface such that the first heating coil is disposed at a position corresponding to a deformation of the recessed surface on a side of the first rim and such that the second heating coil is disposed at a position corresponding to a deformation of the recessed surface on a side of the second rim, wherein the first bottom conductor portion comprises a first bottom longitudinal conductor portion extending in the circumferential direction, the first corner conductor portion being longer than the first bottom longitudinal conductor portion, and the second bottom conductor portion comprises a second bottom longitudinal conductor portion extending in the circumferential direction, the second corner conductor portion being longer than the second bottom longitudinal conductor portion.

8. A heating coil configured to be opposed to a portion of a workpiece having a rim and a bottom portion that are provided continuously in a longitudinal direction and to be moved relative to the workpiece in the longitudinal direction to heat a recessed surface of the workpiece, the recessed surface being formed by the rim and the bottom portion, the heating coil comprising:

a corner conductor portion extending in the longitudinal direction so as to be opposed to a corner portion between the rim and the bottom portion; and a bottom conductor portion connected to the corner conductor portion in series to be opposed to the bottom portion, wherein the bottom conductor portion comprises a bottom longitudinal conductor portion extending in the longitudinal direction; and the corner conductor portion is longer than the bottom longitudinal conductor portion.

9. The heating coil according to claim 8, comprising a plurality of the bottom longitudinal conductor portions connected to each another in series, wherein the plurality of the bottom longitudinal conductor portions are located at different positions in the longitudinal direction of the workpiece and at different distances from the corner conductor portion.

10. The heating coil according to claim 8, wherein the corner conductor portion comprises a rim opposing surface opposed to the rim of the workpiece, the rim opposing surface being separated from the rim more on a side of a top of the rim than on a side of the bottom portion of the workpiece.

11. The heating apparatus according to claim 1, wherein the first corner conductor portion and the first bottom conductor portion are disposed along one plane.

12. The heating apparatus according to claim 2, wherein the first position adjusting portion and the second position adjusting portion are configured such that a gap between the recessed surface and the first heating coil and a gap between the recessed surface and the second heating coil are individually adjustable.

13. The heating method according to claim 7, wherein the first corner conductor portion and the first bottom conductor portion are disposed along one plane.

14. The heating method according to claim 7, further comprising individually adjusting a gap between the recessed surface and the first heating coil and a gap between the recessed surface and the second heating coil.

15. The heating coil according to claim 8, wherein the corner conductor portion and the bottom conductor portion are disposed along one plane.

* * * * *